(12) United States Patent
Lutz et al.

(10) Patent No.: US 6,491,168 B1
(45) Date of Patent: Dec. 10, 2002

(54) PULP SCREEN BASKET

(75) Inventors: Mark S. Lutz, West Allis, WI (US); Tim Cromell, Waukesha, WI (US)

(73) Assignee: J + L Fiber Services, Inc., Waukesha, WI (US)

( * ) Notice: Subject to any disclaimer, the term of this patent is extended or adjusted under 35 U.S.C. 154(b) by 0 days.

(21) Appl. No.: 09/559,017

(22) Filed: Apr. 23, 2000

(51) Int. Cl.$^7$ ................................................ B01D 29/00
(52) U.S. Cl. ...................... 210/402; 210/403; 210/499; 209/273; 209/395; 209/406
(58) Field of Search ............................. 210/497.01, 499, 210/402, 403, 498; 209/273, 395, 406, 407, 409, 411, 412

(56) References Cited

U.S. PATENT DOCUMENTS

| | | |
|---|---|---|
| 4,428,423 A | 1/1984 | Koehler et al. |
| 4,494,603 A | 1/1985 | Harguindey |
| 4,642,190 A | 2/1987 | Zimmerman |
| 4,699,715 A | 10/1987 | Lee, II |
| 4,832,832 A | 5/1989 | Fujiwara et al. |
| 4,889,629 A | 12/1989 | Jackson |
| 4,897,163 A | 1/1990 | Verheesen |
| 5,011,065 A | 4/1991 | Musselmann ................ 228/170 |
| 5,090,721 A | 2/1992 | Lange ......................... 220/485 |
| 5,094,360 A | 3/1992 | Lange ......................... 220/485 |
| 5,200,072 A | 4/1993 | Frejborg et al. |
| 5,237,154 A | 8/1993 | Pellhammer et al. |
| 5,417,858 A | 5/1995 | Derrick et al. |
| 5,513,757 A | 5/1996 | Papetti |
| 5,595,307 A | 1/1997 | Hautala ....................... 209/395 |
| 5,647,128 A | 7/1997 | Aikawa .................... 29/896.62 |
| 5,718,826 A | 2/1998 | Frejborg |
| 5,727,316 A | 3/1998 | Riendeau |
| 5,791,495 A | 8/1998 | Gero et al. |
| 5,799,798 A | 9/1998 | Chen ........................... 209/306 |
| 5,901,789 A | 5/1999 | Donnelly et al. |
| 5,944,993 A | 8/1999 | Derrick et al. |
| 5,968,357 A | 10/1999 | Doelle et al. |
| 6,021,905 A | 2/2000 | Frejborg |
| 6,056,126 A | 5/2000 | Schabel et al. |
| 6,105,788 A * | 8/2000 | Williamson et al. ......... 210/489 |
| 2001/0050253 A1 | 12/2001 | May et al. |

* cited by examiner

Primary Examiner—Robert J. Popovics
(74) Attorney, Agent, or Firm—Boyle Fredrickson Newholm Stein & Gratz S.C.

(57) ABSTRACT

A pulp screening assembly where each support ring is weldlessly bonded to a perforate screen section by a bonding material that preferably is a brazing material. There is a joint between each ring and a screen section in which brazing material is disposed. The joint includes at least one set of mating faying surfaces that are offset relative to a longitudinal axis of the screening assembly. In a preferred embodiment, there is a tolerance between mated faying surfaces of no greater than 0.008 inches to ensure a good weldless bond is achieved. In another preferred embodiment, the tolerance is no greater than 0.004 inches. A weldless screen basket is produced having end rings, a plurality of slotted screen sections, and an intermediate ring having slots with back grooves within four millimeters of a ring at each end increasing screening open area.

29 Claims, 13 Drawing Sheets

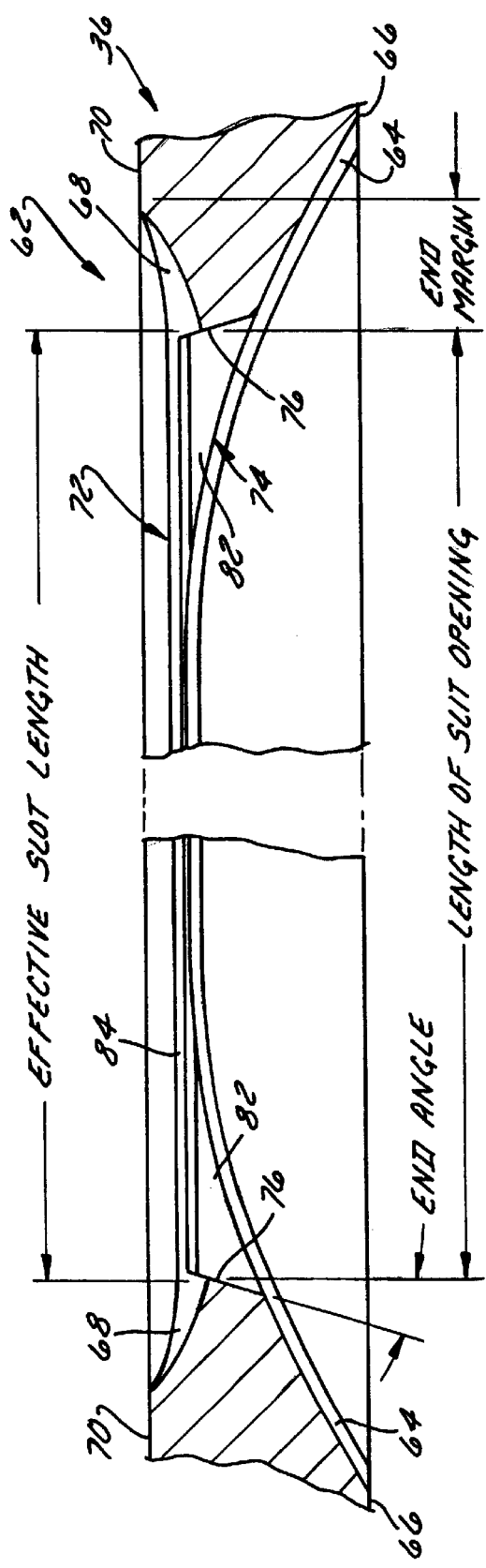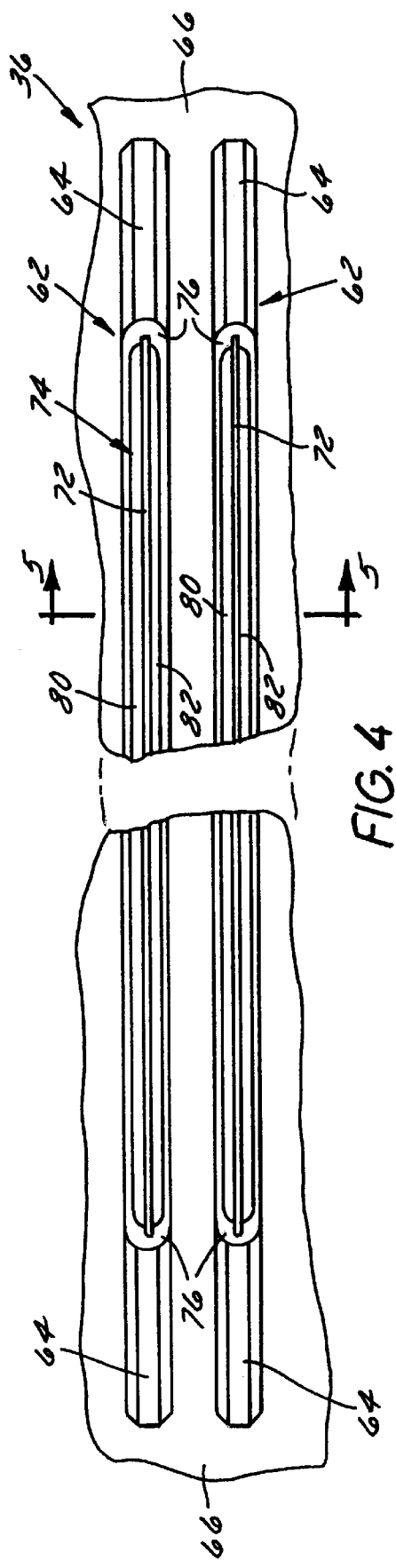

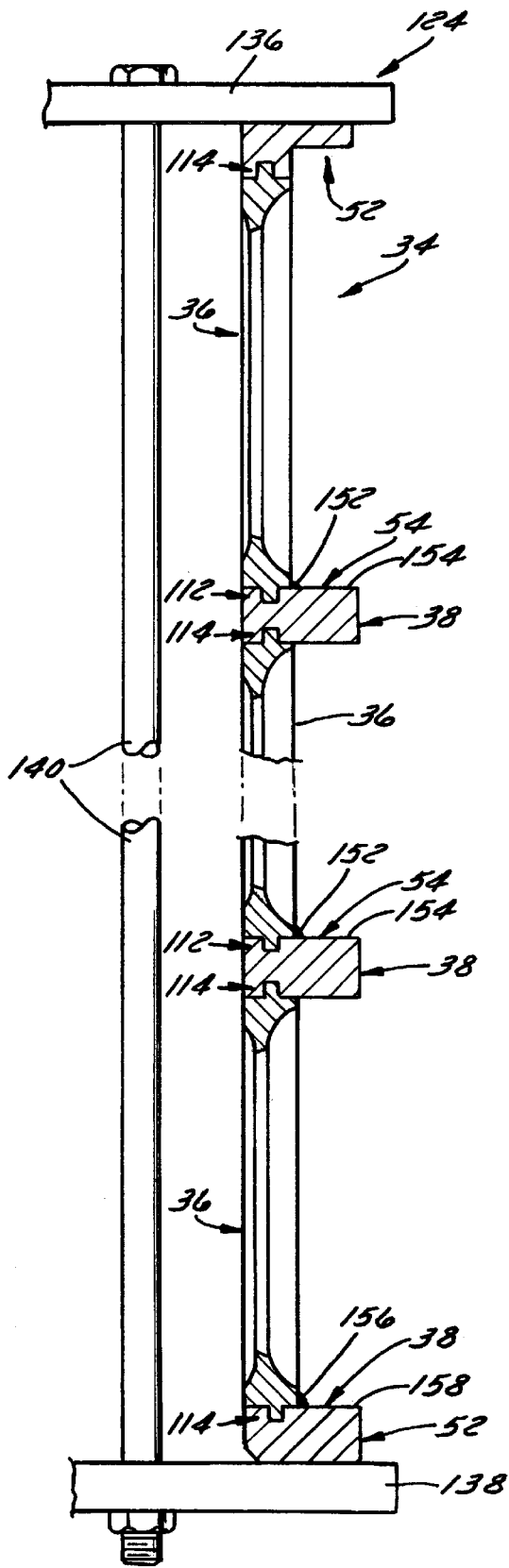
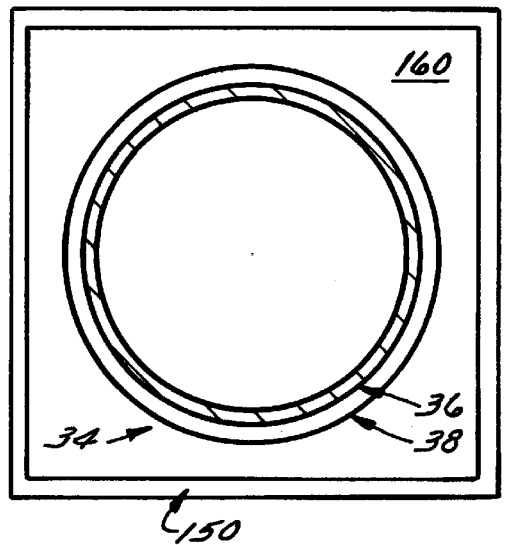
FIG. 18
FIG. 19

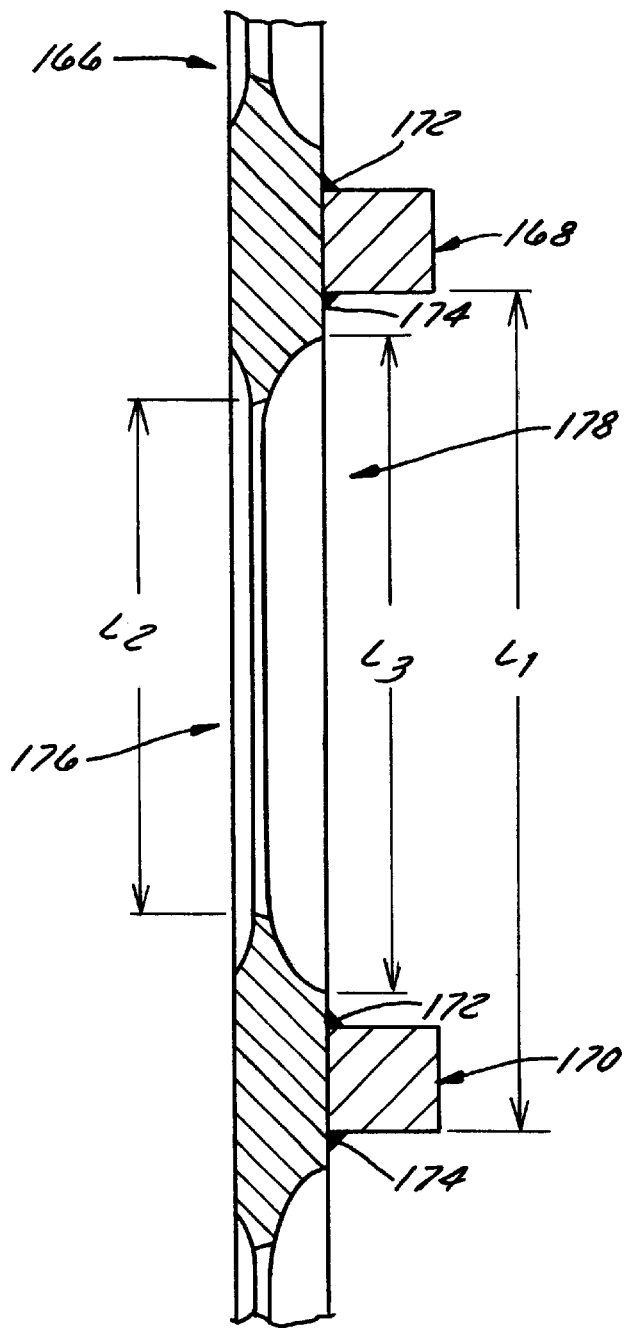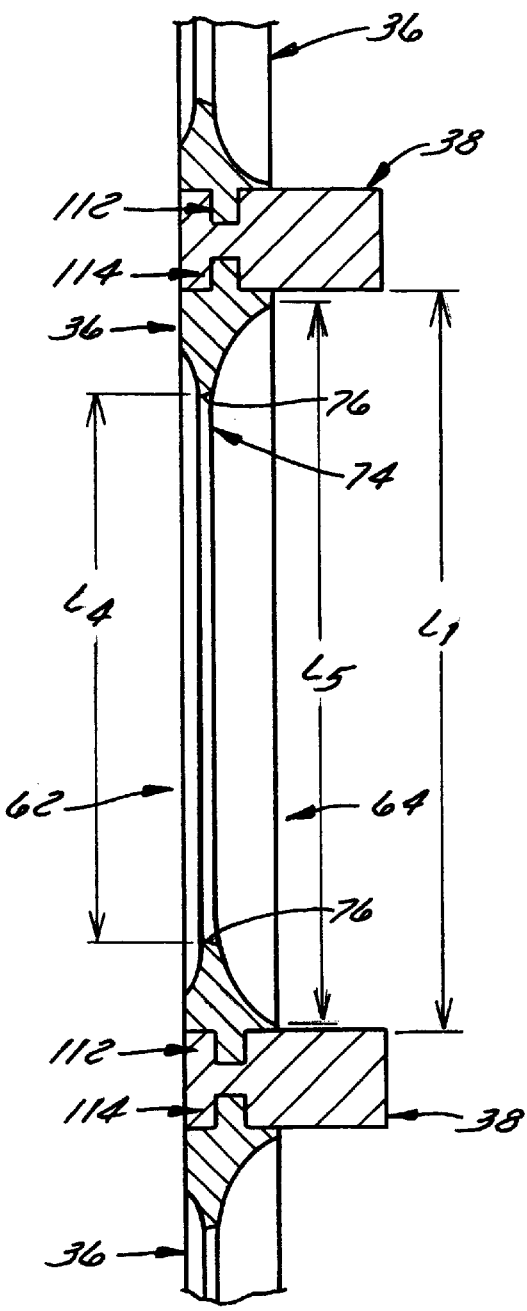
FIG. 21
PRIOR ART
FIG. 22

PULP SCREEN BASKET

FIELD OF THE INVENTION

The present invention relates generally to pulp screens for use in screening or filtering stock used in making paper and other fiber related products, and more particularly to slotted screen baskets for use in a pulp screening apparatus.

BACKGROUND OF THE INVENTION

Perforate screens are often used to filter liquid. For example, screens are used to filter particulates entrained in water, such as debris in wastewater or fiber in a stock slurry. For example, screens are used to remove debris from a stock slurry including other fiber that is undesirable for use in making fiber products. Screens are also used to remove debris from a slurry containing aggregates and/or powder. Screens can be used for other filtering or screening application.

Screens are also used to classify matter in a liquid. For example, screens are used to filter out matter having a certain size and greater (or smaller) from a flow of liquid. Similarly, screens filter out particles of a certain size or size range while permitting other particles having a certain size or size range to remain in the liquid. Classifying applications include classifying fiber in a slurry for papermaking applications, classifying powder in a slurry, classifying aggregates in a slurry, and classifying other materials entrained in a flowing liquid.

Each screen is of perforate construction having a plurality of pairs of perforations or holes that each permit liquid and matter to pass through. The size and shape of each hole is selected for the particular filtering or classifying application and determines what matter is removed from the liquid and what matter is retained.

One type of screen is generally cylindrical and has a plurality of generally cylindrical perforate metal sidewalls that are disposed generally along a common central axis and which both are affixed to metal support rings. For example, where the screen has two such cylindrical sidewalls, there is a single intermediate support ring between the two sidewalls and an end ring at each end. The rings are connected by spaced apart rods that are tightened to keep the rings and cylindrical sidewalls captive in compression.

Each metal sidewall is made of a rectangular panel that is first machined to form screening holes therein, rolled into a cylinder, and then welded to retain its cylindrical shape. In the pulp industry, each sidewall is referred to as a screen section and the screening holes are shaped like slots.

Before assembly, the rings and the sidewalls must be machined to form suitable weld joints. In assembling the screen, the sidewalls and rings are received in an expensive and complicated welding fixture. Prior to welding, each of the rings are heated to shrink fit them around each screen sidewall. During welding, expensive welding equipment is used to weld each support ring to at least one of the metal sidewalls. The intermediate support ring is welded to both sidewalls.

After welding, post-weld grinding and finishing must be performed to clean each weld, remove weld splatter, and remove weld discoloration. In an attempt to relieve thermal stresses introduced by all the welding that is performed, the assembled and welded screen is heat treated.

Welding is expensive, time consuming, costly and produces a screen with limitations. The fixtures and equipment used to weld are expensive, complicated and time consuming to set up, and require a great deal of labor. A screen produced by welding, even by laser or electron beam welding, has stresses present, even after stress relieving, that can limit the useful life of the screen. As the cycles that a screen is inevitably subjected to during operation accumulate, premature failure can occur because the screen has not been adequately stress relieved. Even if adequately stress relieved, cracks can still form in a weld or in the heat affected zone of a weld. Screen performance can also be adversely affected by welding-induced thermal distortion that is not eliminated by stress relieving.

Welding also can reduce the total area available for screening. For example, where the screen is held together by conventional welds, the welds that join each support ring to a sidewall limit the space available for screening holes or slots by at least three or four millimeters adjacent each ring about the entire periphery of the screen.

Thus, the need exists for a screen which lacks at least some of these disadvantages.

SUMMARY OF THE INVENTION

Pursuant to one aspect of the invention, a screening assembly is provided for a screening apparatus that includes at least one perforate sidewall that is joined by a bonding material to a support ring. In one embodiment, the perforate sidewall is a slotted screen section and is joined by bonding material, preferably brazing material, to the support ring. The resultant screening assembly preferably is of monolithic or unitary construction that is strong, tough, and resilient.

The screen section is of metallic construction. In one preferred embodiment, the screen section is made of a stainless steel that preferably is of austenitic construction. The screen section preferably is shaped into a cylinder or hoop and has a plurality of pairs of spaced apart and elongate slots that each includes a slit that extends completely through the cross section of the screen section. In one preferred slot construction, the slot is formed by a contour cut on one side and a back groove on the other side that is aligned with the contour cut producing intersects of the slot to produce the slit. In another preferred slot construction, the back groove has a material relief that removes residual material between the contour cut and back groove at each end of the slit to thereby extend the length of the slit. Such a screen section is well suited for screening pulp fiber in a stock slurry.

In one preferred screening assembly, the screening assembly is a screen basket that is comprised of at least one perforate screen section that carries a pair of spaced apart support rings. Each support ring bounds a periphery of the screen section that preferably is the outer periphery. In another preferred screen basket, the basket is of modular construction and includes at least two screen sections, a pair of end support rings, and at least one intermediate support ring. An intermediate support ring preferably is disposed in between each pair of adjacent screen sections.

There is a joint between each support ring and the screen section where the ring and screen section weldlessly bond. Where the screen basket has end support rings, there can be as little as a single joint between each end ring and the screen section to which it is bonded. Where the screen basket has one or more intermediate support rings, there are at least two joints per intermediate support ring. For example, there is at least one joint formed between the intermediate support ring and each screen section to which it is bonded.

Each joint preferably is defined by at least one faying surface in the ring and at least one faying surface in the screen section forming a set of faying surfaces that preferably abut or are adjacent. The bonding material bonds the faying surfaces to weldlessly attach the ring to the screen section. Preferably, there is at least one set of faying surfaces that are parallel to a longitudinal central axis of the screen basket. To provide sufficient space between each set of faying surfaces to accommodate bonding material, there is a gap or tolerance between each set of faying surfaces. In one preferred embodiment, the gap or tolerance is no greater than 0.008 inches. In one preferred embodiment, each joint can have two sets of spaced apart faying surfaces that are each substantially parallel to the longitudinal central axis of the screen basket. One preferred joint configuration is a tongue and groove joint where there is a tongue formed in either a screen section or the ring and a groove formed in the other component.

Where the bonding material is a brazing material, the brazing material is a brazing alloy that preferably in paste form. One preferred brazing alloy is a nickel base brazing alloy that includes one or more of the following constituents: Chromium, Boron, Silicon, and Iron. A preferred brazing alloy includes all of these constituents and Carbon and Cobalt and can be made in conformance with AMS 4777, AMS 4777F or American Welding Society (AWS) Braze filler metal specification Bni-2. The brazing alloy can also include one or more of the following constituents: Aluminum, Phosphorous, Sulfur, Titanium, and Zirconium.

Pursuant to another aspect of the invention, a method of making a screen basket comprises weldlessly bonding support rings to a screen section. In preparation to bond each ring to a screen section, at least the screening holes or slots are covered, such as by a masking material. A layer of bonding material is disposed in each joint between each ring and screen section.

In one preferred implementation of the method, the bonding material is brazing alloy that is placed in each joint, preferably along the entire length of the joint. The brazing alloy is heated to a temperature above which it becomes flowable or a liquid. Preferably, the brazing alloy is heated to a temperature above its liquidus temperature to braze each ring to a screen section.

To help facilitate wetting of each faying surface of each joint with molten brazing alloy, a vacuum can be applied. In one preferred implementation of the method, the vacuum is at least $4 \times 10^{-4}$ torr or better. In another preferred implementation of the method, the vacuum is at least $1 \times 10^{-4}$ torr.

To help prevent carbide formation, the assembled and brazed screen basket is quenched. Quenching, preferably nitrogen quenching, is performed to lower the temperature to a temperature below the solidus temperature of the brazing alloy. In one preferred implementation, the temperature of the brazed screen basket is lowered after brazing to a temperature of about 150° F. (66° C.) in less than about twenty minutes.

In one preferred implementation of the method, during brazing, at least the screen section is heated to a temperature at or above which stress relieving and/or annealing occurs. The temperature is held at or above the annealing and/or stress relieving temperature at least until annealing occurs. Oxidation on the outside of the screen basket is removed during annealing.

In another preferred implementation of the method, at least the screen section is heated after annealing and/or stress relieving to a temperature at or above which boron diffusion occurs. The temperature is held at or above the boron diffusion temperature at least until boron diffusion occurs.

An oven that preferably is a vacuum furnace preferably is used in brazing. The vacuum preferably is applied during annealing and boron diffusion. During brazing, the screen section and brazing alloy is heated to a temperature of at least 1650° F. (899° C.). Where the screen section is made of an austenitic stainless steel, at least the screen section is heated for at least ten minutes to a temperature of at least 1850° F. (1010° C.) and preferably no greater than 1925° F. (1052° C.) to anneal the screen section. Where boron diffusion is performed, at least the screen section is heated for at least one hour and as much as two hours to a temperature of at least 1700° F. (927° C.) and preferably no greater than 1900° F. (1038° C.). Quenching is performed at the end to reduce the temperature to about 150° F. (66° C.) in about twenty minutes or less.

After brazing is completed, any masking material is removed. In one preferred implementation of the method, the masking material is removed by sandblasting, which also deburrs slots machined into each screen section. After sandblasting, the screen basket can be electropolished to smooth sharp edges. After electropolishing, the screen basket can be chrome plate.

Objects, features, and advantages of the present invention include one or more of the following: a screening assembly and method of making the same that requires no fixturing to keep components in precise alignment during bonding; eliminates the need for any post-weld heat grinding and finishing; eliminates the need to shrink fit support rings; maintains dimensional stability and eliminates virtually all dimensional distortion associated with welding; produces a finished screening assembly that is bright and shiny without discoloration and which accepts chrome plating well; requires no further machining after bonding is complete; enables filter slots to extend to each adjacent support ring thereby increasing filtering area; increases screening assembly strength; eliminates screen section waviness found in welded screening assemblies; makes rotor clearance more uniformly parallel in the axial direction along the entire axial length of the rotor which increases screening assembly performance; produces a screening assembly that is fully solution annealed, which improves corrosion resistance; stress relieves all weld joints in all screen sections and rolled support rings; enhances the quality of each such preexisting weld joint; makes the hardness of each such preexisting weld joint more uniform throughout the cross section of the joint; improves the corrosion resistance of each preexisting weld joint; increases the surface area available for screening; produces a bonded screening assembly that is of simple, durable, tough, monolithic construction that lasts longer and which improves screen assembly performance; and a method that is simple, less labor intensive, cheaper, and which produces a screening assembly of higher quality construction that is dimensionally truer and which lasts longer at a higher level of performance.

Other objects, features, and advantages of the present invention will become apparent to those skilled in the art from the detailed description and the accompanying drawings. It should be understood, however, that the detailed description and accompanying drawings, while indicating at least one preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which:

FIG. 3 is an enlarged fragmentary sectional view of a portion of the screen basket illustrating a preferred filter slot configuration;

FIG. 4 is a fragmentary bottom plan view of a portion of the screen basket that depicts a pair of the filter slots;

FIG. 18 shows an exemplary fixture for clamping the ends of an assembled screen basket during bonding of the components of the screen basket;

FIG. 19 depicts placement of an assembled screen basket into an oven for heating of the bonding material;

FIG. 21 illustrates a fragmentary cross section of a welded prior art screen basket;

FIG. 22 illustrates a fragmentary cross section of a screen basket of this invention that has been weldlessly assembled and bonded.

DETAILED DESCRIPTION OF THE PREFERRED EMBODIMENTS

Figure 1:
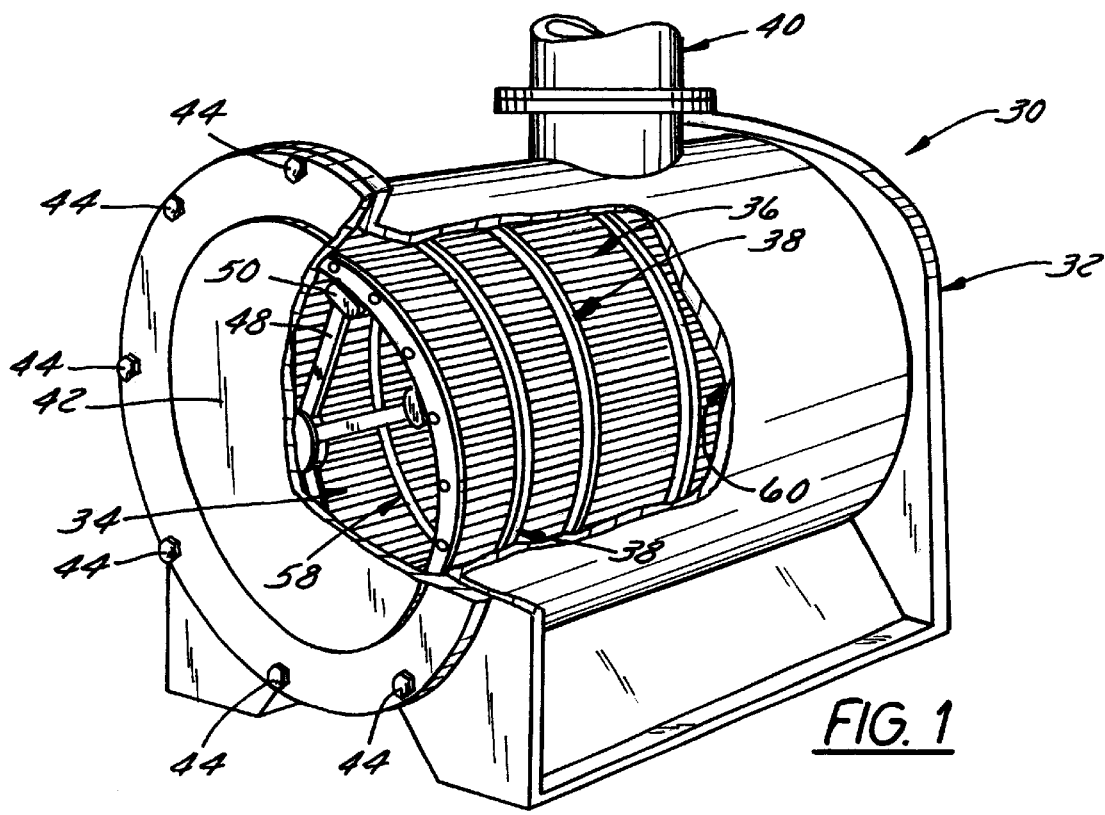
FIG. 1 is a perspective view of a filtering or classifying apparatus with its housing partially cutaway to show a screening basket inside the housing.
Figure 2:
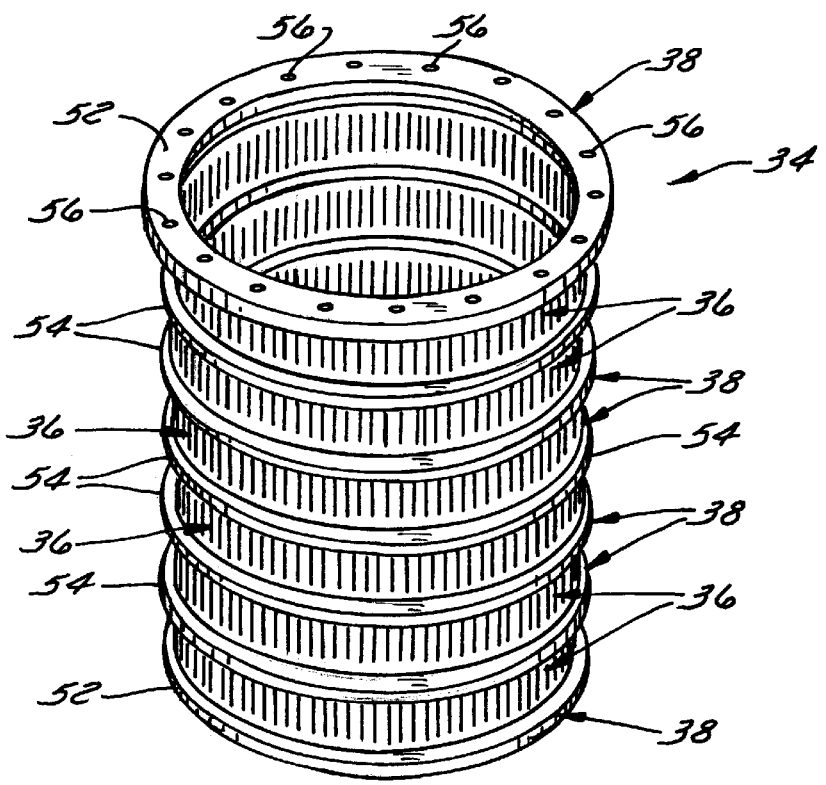
FIG. 2 is a perspective view of a weldless perforate screen basket.

FIGS. 1 and 2 illustrate a screening apparatus 30 that has a housing 32 and a cylindrical screen basket 34 disposed in the housing 32. The screen 34 is comprised of a plurality of modular perforate cylindrical sections 36 (sometimes referred to as screen hoops) that are each weldlessly affixed at each axial end to a circular support ring 38. The screening apparatus 30 has an inlet (not shown), through which slurry or liquid passes, and an outlet 40, from which filtrate exits. Typically, the apparatus 30 also has a contaminant discharge (not shown), through which filtered or rejected material is removed. So that the screen 34 can be removed and replaced, the apparatus 30 typically includes a cover 42 attached to the housing 32, such as by fasteners 44.

A rotor 46 can be disposed inside the screen 34. The rotor 46 has spaced apart arms 48 that are each equipped with a foil 50, preferably a hydrofoil, located adjacent the screen 34. Each foil 50 preferably extends substantially the axial length of the screen 34 and rotates during operation to help improve flow through the screen 34.

The housing 32 rests upon a base that spaces the apparatus 30 off the floor. Although the apparatus 30 is shown with the screen 34 oriented horizontally, the apparatus 30 can be constructed and arranged to orient the screen 34 vertically.

During screen operation, slurry to be filtered or classified is introduced through the inlet to an interior chamber 58 inside the screen 34. The slurry passes through passages in the screen 34 to an exterior chamber 60 between the screen 34 and housing 32 where it then exits the screening apparatus 30 through the outlet 40 as filtrate. Contaminants and rejects are removed from the screening apparatus via the contaminant discharge.

Figure 5:
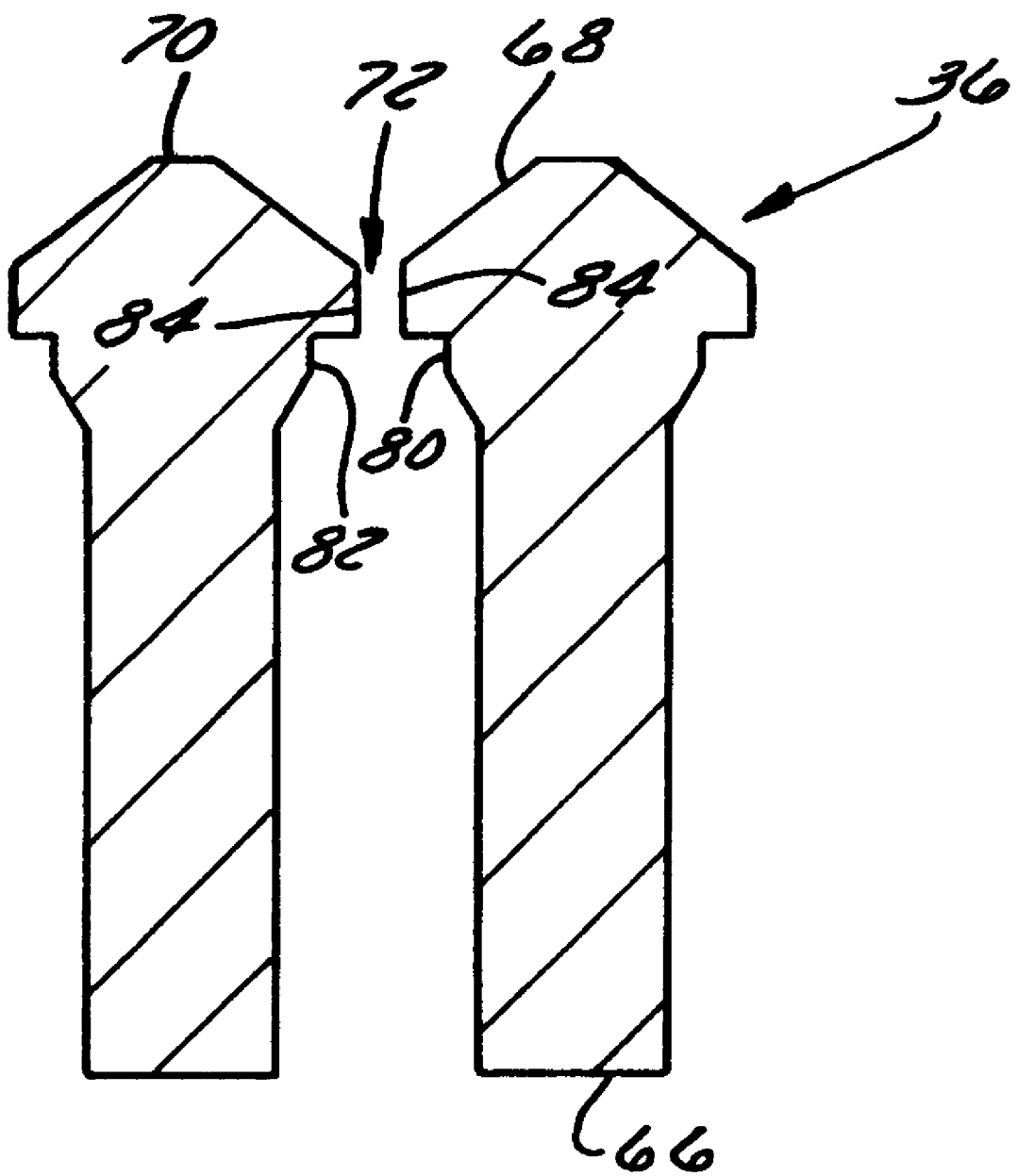
FIG. 5 is an enlarged sectional view of part of the screen basket taken along line 5—5 of FIG. 4 depicting in more detail one preferred filter slot configuration.

FIGS. 3–5 illustrate a fragmentary cross section of part of a screen section 36 and depicts in more detail a preferred embodiment of a filtering or screening passage that generally has the shape of a slot 62. The slot 62 is formed by a back groove 68 in an outer or outflow surface 66 of the screen section 36 and a contour cut 68 formed in an inner or inflow surface 70 of the screen section 36. The back groove 68 and contour cut 68 are generally aligned and produce a slit 72 through which slurry flows during screen operation. Both the back groove 68 and contour cut 68 preferably are formed using a radiused milling cutter. In the slot embodiment shown in FIG. 5, the contour cut 68 is generally vee-shaped.

The slot 62 preferably includes a material relief 74 formed in the back groove 68 and that has a pair of endwalls 76, 78 and sidewalls 80, 82. The material relief 74 increases the effective length of the slot 62 by making the thickness of residual material 84 left after forming the back groove 68 and the contour cut 68 more uniform. The material relief 74 does so by removing residual material 84 at each end of the slit 72. This decreases or prevents formation of any slurry boundary layer adjacent each slit end, which increases slot filtering efficiency. As a result, a slot 62 of this preferred construction will have a greater throughput for a given length as compared to a slot 62 that lacks such a material relief (FIG. 20B).

Where the screen 34 is to be used for a pulp screening application, the width of each contour cut 68 preferably is no greater than about 3 mm where the contour cut 68 is widest. Each slit 72 preferably is less than half as wide as the contour cut 68 and preferably is no wider than 0.5 mm at its widest point. Each slit 72 preferably is at least 2 cm long. Each back groove 68 preferably has a width no greater than about 5 mm at its widest point. Each screen section 36 preferably has a cross sectional thickness of no greater than about 9 mm and the residual material 84 has a cross sectional thickness of no greater than 0.25 mm where it is thinnest.

Figure 14:
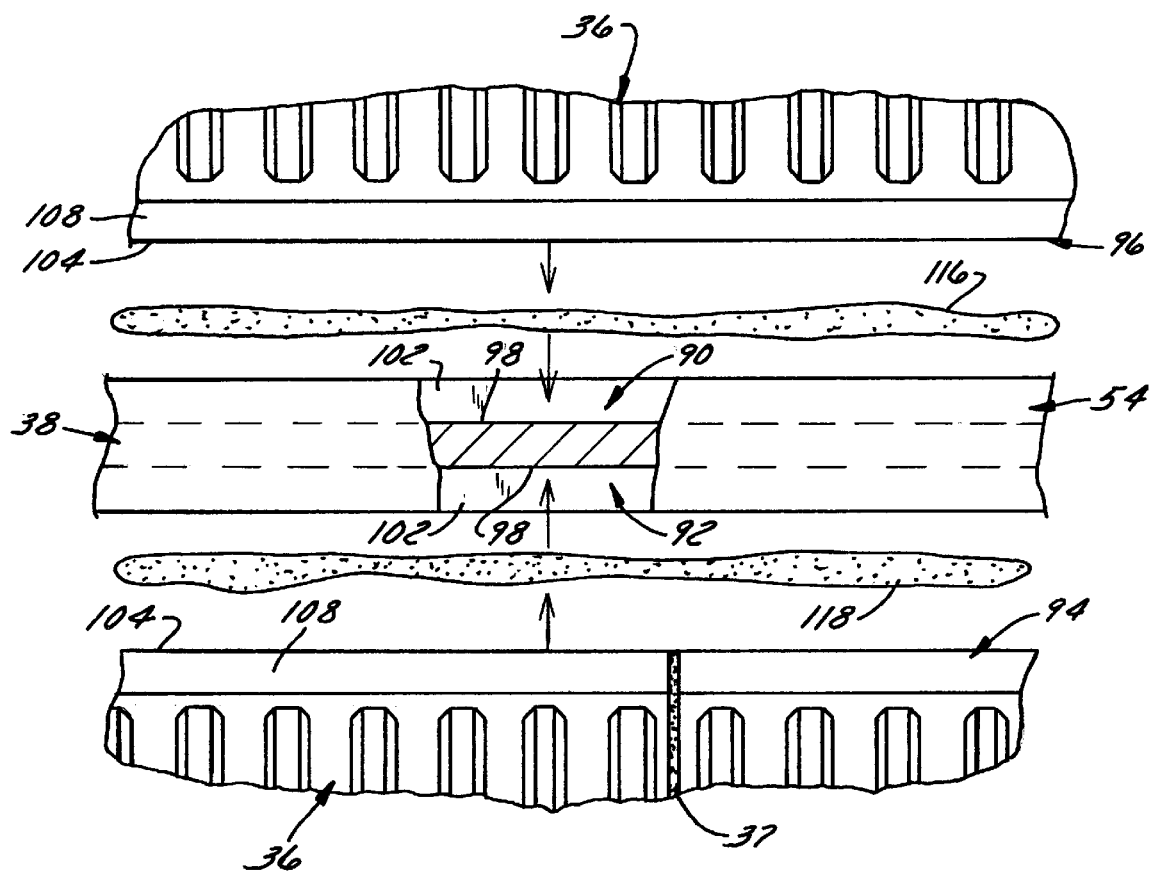
FIG. 14 is a fragmentary plan view depicting weldless assembly of a pair of screen sections into an intermediate support ring with a bead of a bonding material disposed between each screen section and the support ring.

Each screen section 36 is made of a strong and resilient material, such as a stainless steel. Examples of preferred screen section materials include 316F stainless steel, 316S stainless steel, 316LS stainless steel, or 2205 stainless steel. Each screen section preferably has a diameter of between eight inches (20.3 cm) and eighty inches (203 cm). Each screen section 36 preferably is formed of a plate in which slots 62 are formed. The ends of the plate are either welded or otherwise interlocked to retain the cylindrical shape of the screen section 36. For example, FIG. 14 illustrates a longitudinally extending weld 37 used to secure the plate ends when rolled into a cylinder to form screen section 36.

Figure 6:
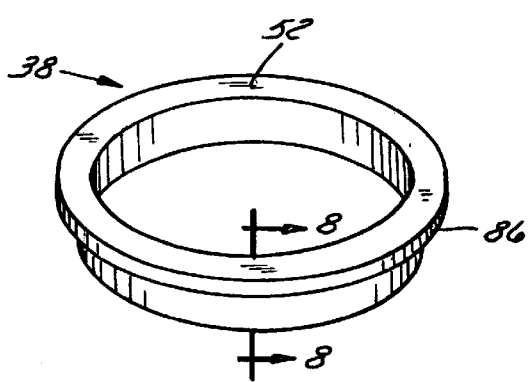
FIG. 6 is perspective view of an end support ring.
Figure 7:
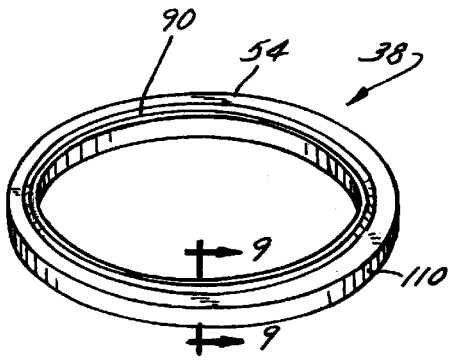
FIG. 7 is a perspective view of a support ring that is located between a pair of end rings.
Figure 8:
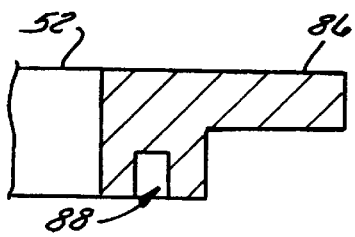
FIG. 8 is a cross sectional view taken along line 8—8 of the end support ring shown in FIG. 6.
Figure 9:
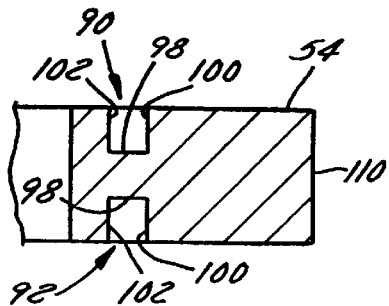
FIG. 9 is a cross sectional view taken along line 9—9 of the intermediate support ring shown in FIG. 7.
Figure 10:
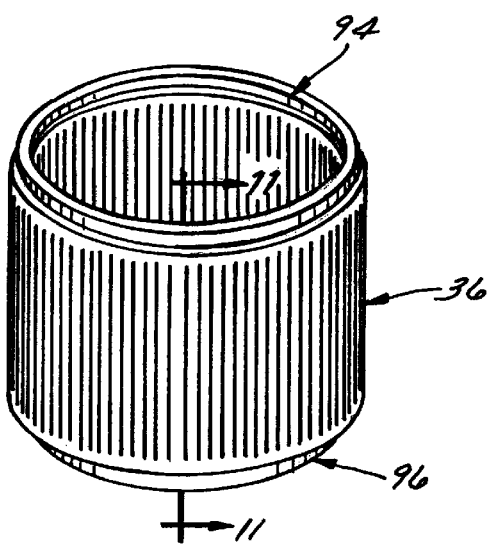
FIG. 10 is a perspective view of a slotted screen section.
Figure 11:
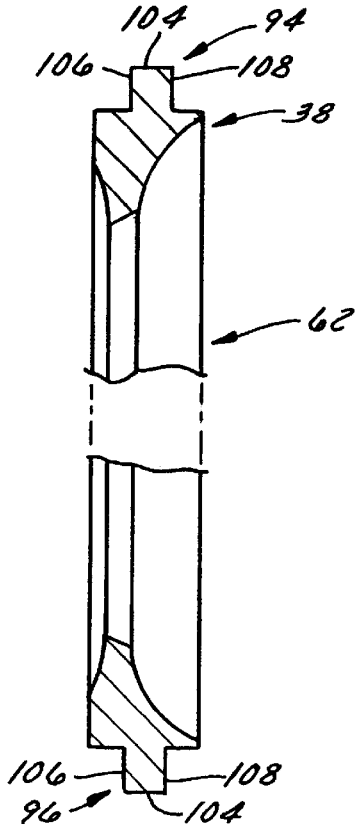
FIG. 11 is a cross sectional view of the screen section taken along line 11—11 of FIG. 10.

Referring to FIGS. 2, 6 and 7, the screen 34 shown has two types of support rings 38. The screen 34 has an end ring 52 at each end and a plurality of axially spaced apart intermediate support rings 54 that are disposed between adjacent screen sections 36. Each intermediate ring 38 is made of a strong and resilient material that preferably is a metal or of metallic construction. A preferred ring material is a stainless steel that preferably is an austenitic stainless steel. Examples of preferred ring materials include 316L stainless steel, 17-4 PH stainless steel, or 2205 duplex steel.

The end ring 52 shown in FIGS. 1 and 6 has a generally L-shaped cross section with a radially outwardly extending flange 86 about its periphery. If desired, the end ring 52 can have a cross sectional shape similar to or the same as an intermediate ring 54. The intermediate ring 54 preferably also includes a flange 110 that extends radially outwardly from the screen 34 when it is assembled.

In one preferred screen embodiment, one or more support rings 38 are made using a centrifugal casting process. A centrifugally cast ring 38 produces a ring that is more circular than rings made by bending and welding originally straight stock and remains more circular over time. Such a ring is weldless and therefore lacks any weld where a crack or corrosion can form.

In another preferred embodiment, one or more support rings can be forged. If desired, one or more of the support rings can be made by bending and welding or by flame cutting.

As is shown in FIG. 2, each end ring 52 can have a plurality of spaced apart bores 56 that can each receive a tie rod (not shown) that extends axially from one end ring 52 to the other end ring 52. Fasteners, such as nuts, attach to each tie rod so it can be tightened to capture the screen in compression. As a result of the weldless construction producing a screen 34 that is stronger and more structurally sound than welded screens, the preferred screen embodiment needs no tie rods.

Referring additionally to FIGS. 8–11, each support ring 38 has at least one groove in it to accept a tongue of a screen section 36. The end ring 52 has a single groove 88, while each intermediate ring 54 has a pair of grooves 90, 92. Each screen section 36 has a pair of spaced apart and outwardly extending tongues 94, 96. If desired, each support ring 38 can be equipped with at least one tongue that is received in a groove in a screen section 36.

Each groove 88, 90 and 92 preferably has a cross sectional shape that is substantially complementary to the cross sectional shape of the tongue it receives. Referring to groove 90 shown in FIG. 9, each groove is defined by a bottom wall 98 and a pair of spaced apart sidewalls 100 and 102. Referring to tongue 94 shown in FIG. 11, each tongue is defined by an end wall 104 and a pair of spaced apart sidewalls 106 and 108. In the preferred embodiment shown in FIGS. 8–11, each groove 88, 90 and 92 has a square cross sectional shape and both tongues 94 and 96 have a complementary square cross sectional shape. Tongues 94 and 96 preferably are both square, parallel tongues and grooves 88, 90 and 92 preferably are square, parallel grooves. The tongues 94, 96 and grooves 88, 90, 92 can be formed by a machining process, such as by milling, cutting, drilling, or another machining process. If desired, the tongues 94, 96 and grooves 88, 90, 92 can be cast or otherwise integrally formed.

Figure 12:
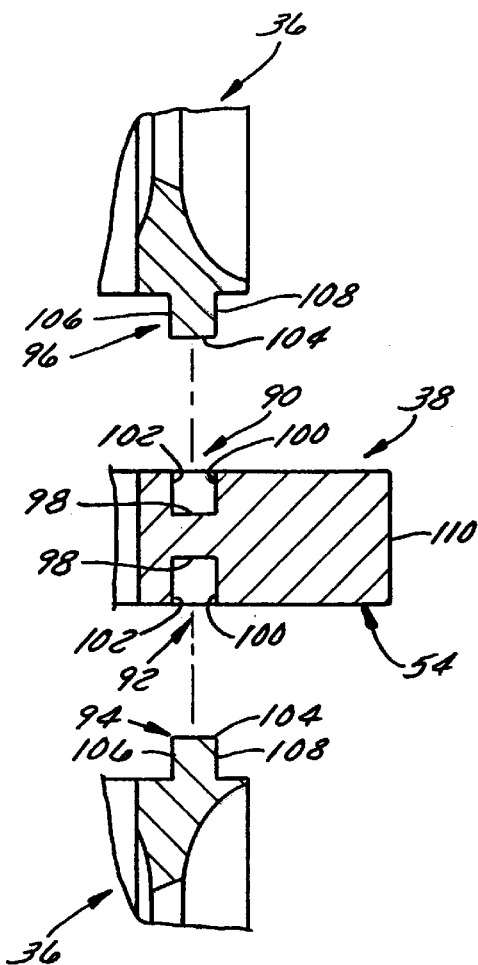
FIG. 12 is a fragmentary cross sectional view of a pair of screen sections being weldlessly assembled to an intermediate support ring.

FIG. 12 illustrates a preferred method of assembling a screen 34. A first screen section 36 (upper screen section) is assembled to an intermediate ring 54 such that its tongue 96 is received in the groove 90 of the ring 54. A second screen section 36 (lower screen section) is assembled to the ring 54 such that its tongue 94 is received in the other groove 92 of the ring 54.

Figure 13:
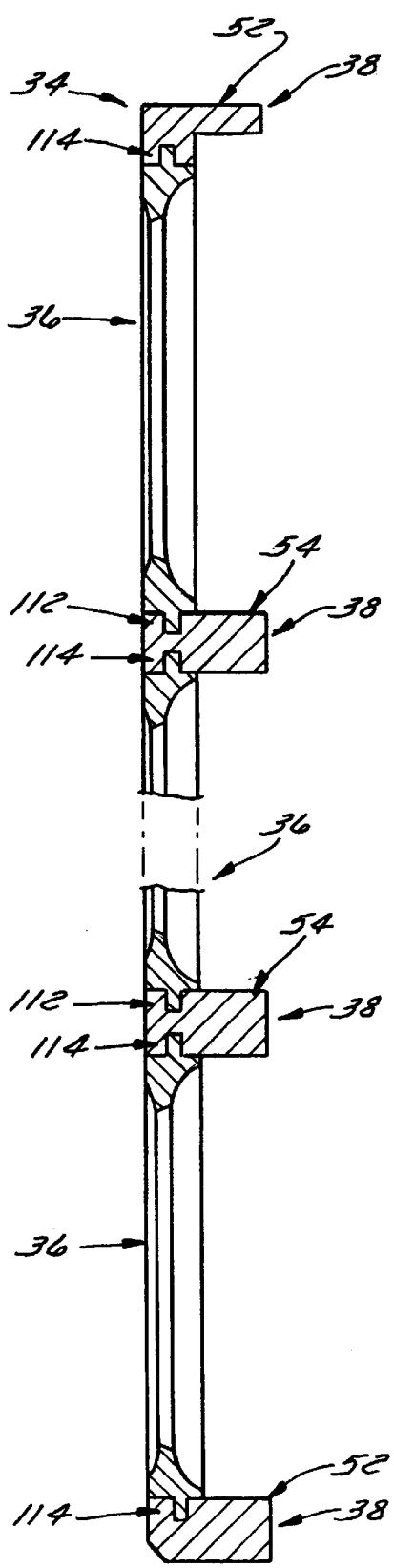
FIG. 13 is a sectional view of an assembled screen basket of weldless construction.

FIG. 13 illustrates a screen 34 after assembly is completed. The assembled screen 34 has at least three perforate screen sections 36, at least two intermediate rings 54, and a pair of end rings 52. When assembled, sidewalls 100 and 108 and sidewalls 102 and 106 of each joint 112 and 114 are bonded. The sidewalls 100 and 102 and sidewalls 106 and 108 of each joint 112 and 114 are preferably attached by a thin layer of a bonding material (not shown in FIG. 13).

To ensure a good bond, the combined tolerance of an assembled tongue and groove of each joint 112 and 114 is no greater than about eight thousandths of an inch (0.2 mm). In a preferred embodiment, the tolerance of each groove sidewall 100, 102 and each tongue sidewall 106, 108 is no greater than about four thousandths of an inch (0.1 mm).

FIGS. 14–17 illustrate a preferred method of assembling a pair of screen joints 112 and 114 and a screen 34. A first bead of bonding material 116 is disposed in groove 90 and the tongue 96 of screen section 36 is inserted into the groove 90. A second bead of bonding material 118 is disposed in groove 92 and the tongue 94 of another screen section 36 is inserted into the groove 92. In one preferred bonding material embodiment, the bonding material preferably is at least somewhat deformable, pliable, or flowable when it is applied in each groove.

Figures 15, 16:
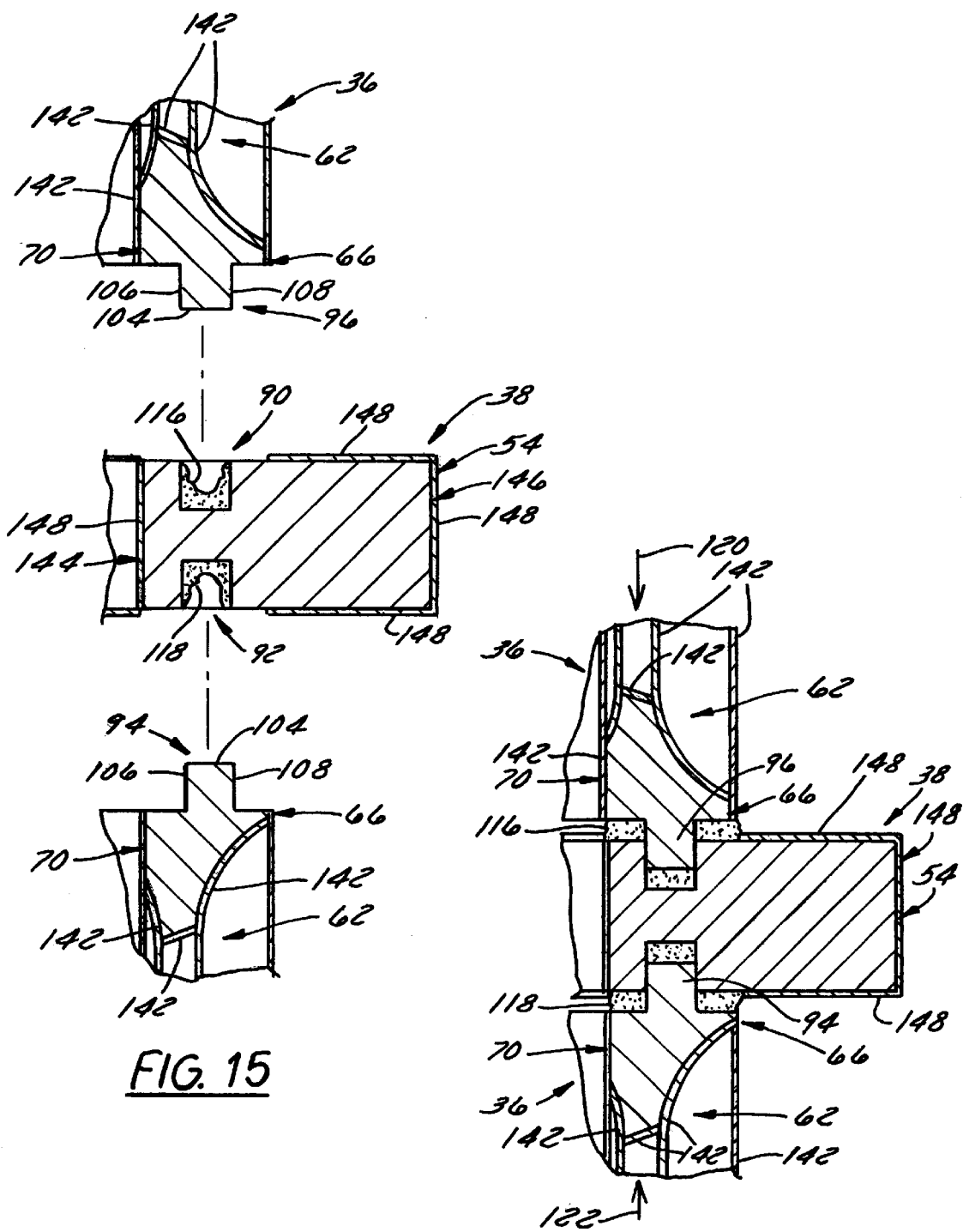
FIG. 15 illustrates a fragmentary cross sectional view of a pair of screen sections prepared for assembly and bonding material disposed in each groove in the support ring.
FIG. 16 illustrates a further step of assembly where a tongue of each screen section is being received in a groove in the support ring.

Force is applied in the direction indicated by arrows 120, 122 shown in FIG. 16 to urge each tongue 94 and 96 into its corresponding groove 90, 92. Force preferably is applied until the bonding material 116, 188 of each joint 112, 144 has effected bonding of each screen section 36 to a corresponding support ring 38. The applied force helps spread the bonding material 116, 118 received in each groove such that bonding material preferably is disposed between surfaces 98, 100, 102, 104, 106 and 108 of the joint created when a tongue is inserted into a groove.

Figure 17:
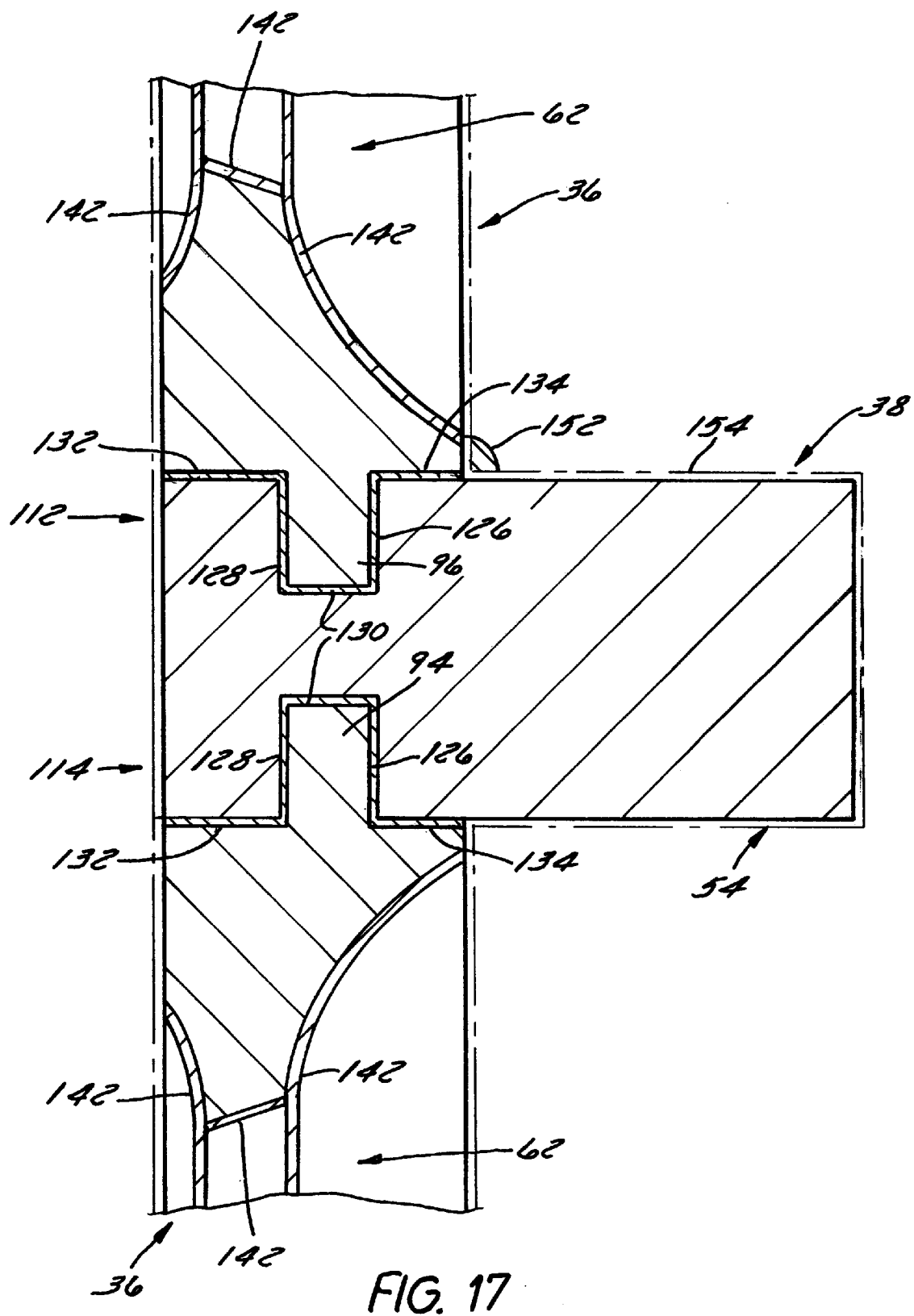
FIG. 17 illustrates the screen sections after being assembled to the support ring.

Each bonded joint 112 and 114 has a bond between tongue sidewall 106 and groove sidewall 102 and tongue sidewall 108 and groove sidewall 100. Referring to FIG. 17, the bond between the adjacent tongue and groove sidewalls is preferably produced by a thin layer of bonding material 126, 128 disposed between tongue sidewall 106 and groove sidewall 102 and tongue sidewall 108 and groove sidewall 100. Each bonded joint can also have a thin layer of bonding material 130 between the tongue end wall 104 and the groove bottom wall 98. Each bonded joint can also include thin layers 132, 134 of bonding material between the end of the screen section 36 where it abuts against the support ring 38. The bonding material can diffuse into the material of the screen section 36 and support ring 38.

After assembly and preferably during bonding, force 120 and/or 122 is applied by a fixture, such as the clamp 124 shown in FIG. 16. In its preferred embodiment, the clamp 124 is of relatively simple construction and includes a plate or bar 136, 138 that abuts against each axial end of the screen 34. The plates or bars 136, 138 at each end are connected by a rod 140 that is tightened to urge the plates or bars together. Urging the plates or bars 136, 138 together places the screen 34 in compression to help urge each tongue of the assembly farther into each groove. This helps increase the amount of surface area of the tongue that overlaps the surface area of the groove to produce a better bonded, stronger joint.

Referring once again to FIGS. 15 and 16, to prevent bonding material from adhering to the screen section 36 in places other than in a joint, parts of the screen are coated with a masking material 142. Where a masking material 142 is used, the masking material 142 is applied as a coating, paint, film, or tape over portions of the exterior of each screen section 36. Preferably, masking material 142 is applied on all of the screen section surfaces that define each slot 62. Preferably, masking material 142 is also applied on the outflow surface 66 surrounding each slot 62. Masking material 142 can be applied to surfaces that define the feed or inflow side of each slot 62 and the feed or inflow surface 70 surrounding each slot 62. If desired, the exterior and interior surfaces 144, 146 of each support ring 38 can be covered with a layer of the masking material 148.

After any needed masking material is applied, the assembled screen 34 is placed in an oven 150, such as the oven 150 depicted in FIG. 19, and the temperature is increased to heat the bonding material in the joints 112 and 114 of the screen 34. The bonding material preferably is heated to a temperature above its melting temperature so it can flow in each joint 112 and 114. By melting the bonding material so it will flow or flow better, it helps maximize the tongue and groove surface area of each joint 112 and 114 of the screen 34 that is coated with bonding material. As a result, a bond that is uniform, strong, and of good integrity is produced when the bonding material is allowed to cool or cooled to a temperature below its melting temperature.

To help ensure that the joint surfaces are better and more uniformly coated with bonding material, the oven 150 preferably comprises a chamber in which the pressure is lowered below ambient pressure. A vacuum preferably is applied while the screen is inside the oven 150 and being heated to a temperature above the bonding material melting temperature. The screen 34 preferably is heated and subjected to a vacuum while fixtured by clamp 124.

In a preferred method of making a screen 34, the bonding material is a brazing alloy. A preferred brazing alloy is a nickel base alloy that has at least one of the following additional constituents: carbon, silicon, chromium, cobalt, iron, and boron. A preferred brazing alloy includes all of the aforementioned constituents in a nickel base. A preferred brazing alloy composition is as listed in Table 1 below:

TABLE 1

| Carbon | 0.50% maximum |
| --- | --- |
| Silicon | 3.0%–5.0% |
| Chromium | 6.0%–8.0% |
| Nickel (+ Cobalt) | 78.0%–86.0% |
| Cobalt (if determined) | 1.0% maximum |
| Iron | 2.0%–4.0% |
| Boron | 2.5%–3.5% |

One preferred brazing alloy has a nickel base and a chemical composition of about 4% Silicon, about 7% Chromium, about 3% Iron, and 3% Boron and can be made in conformance with aeronautical material specification no. 4777 (AMS 4777). When made in conformance with AMS 4777, the brazing alloy has a solidus temperature of not lower than 1770° F. (966° C.) and a liquidus temperature of not higher than 1900° F. (1038° C.). Another preferred brazing alloy has a chemical composition of about 82% Nickel, about 4.5% Silicon, about 7.0% Chromium, about 3.1% Boron, and about 3.0% Iron and can be made in conformance with AMS 4777F. When made in conformance with AMS 4777F, the brazing alloy has a solidus-liquidus temperature range of between 1780° F. and 1830° F. (971° C. to 999° C.).

A still further preferred brazing alloy has one or more of the following additional elements: Sulfur, Aluminum, Titanium, Phosphorous, and/or Zirconium. This preferred brazing alloy is conforms to AWS Braze filler metal specification Bni-2 and has a typical chemical composition of 6.0–8.0% Chromium, 2.75–3.50% Boron, 4.0–5.0% Silicon, 2.5–3.5% Iron, about 0.06% Carbon, about 0.02% Phosphorous, about 0.02% Sulfur, about 0.05% Aluminum, about 0.05% Titanium, about 0.05% Zirconium, and the balance percentage of Nickel (approximately 82%).

The brazing alloy preferably is a paste that is comprised of powder in a suitable binder. For example, such a brazing alloy paste can be comprised of 84% to 90% by weight of powder having one of the aforementioned braze alloy compositions. The remainder is comprised of a suitable binder.

The above-mentioned brazing alloy compositions help ensure that a strong and tough joint is produced that is of good integrity. Use of these brazing alloys produces an assembled and bonded screen 34 that is monolithic or unitary construction and which can withstand the high pressure and vibration that the screens ordinarily encounter during operation.

In a preferred method of making a filter screen 34, before any brazing alloy is applied, masking material is applied at least in the slots 62 that are adjacent a joint of each screen section 36. A preferred masking material is a brazing stop-off that is applied in the contour cut 68, back groove 64, and slit 72 of each adjacent slot 62. In one preferred method, brazing stop-off is applied to each slot 62.

The surfaces 98, 100, 102 that define each groove 88, 90, 92 and the surfaces 104, 106, 108 that define each tongue 94, 96 are cleaned using a cleaning compound that can be a solvent. One preferred cleaning compound is alcohol and degreaser. For example, a solution of isopropyl alcohol and a commercially available degreaser can be used to clean at least the faying surfaces, preferably surfaces 100, 102, and 106, 108, so the brazing alloy better adheres during bonding.

Referring once again to FIG. 14, a bead of brazing alloy 116, 118, is applied in each groove 90, 92 of each joint of the screen to be assembled. A preferred brazing alloy is a paste that has a toothpaste-like consistency. As is shown in FIG. 15, the tongue 94 of one screen section 36 is then inserted into groove 92 of intermediate ring 54 and the tongue 96 of another screen section 36 is inserted into groove 90 of the ring 54. The tongue 94 of one screen section 36 is inserted into the groove 88 of a top end ring 52 and the tongue of another screen section 36 is inserted into the groove 88 of a bottom end ring 52.

Referring to FIGS. 17 and 18, after assembly is completed, a bead 152 of brazing alloy is applied on the top surface 154 of each intermediate ring 54 where it meets one of the screen sections 36. Another bead 156 of brazing alloy (FIG. 18) is applied on the top surface 158 of the bottom end ring 52 where it meets the lowermost screen section 36. Each bead 152 and 156 is applied about the entire outer periphery of the screen 34.

Referring to FIG. 18, when assembly is completed, the screen 34 is disposed in clamp 124. The clamp 124 is adjusted to apply a force against the top and bottom end rings 52 capturing the assembled screen 34 in compression.

Referring to FIG. 19, the oven 150 preferably is a brazing furnace. The screen 34 is disposed in a chamber 160 in the furnace 150 where the brazing alloy in each joint is heated to a temperature above its liquidus temperature and then later cooled or allowed to cool to a temperature below its solidus temperature. The furnace 150 preferably is a vacuum furnace that removes some of the atmosphere to create a vacuum in the chamber 160 in which the screen 34 is disposed. Creating a vacuum helps the brazing alloy flow and more uniformly coat the faying surfaces of each joint 112, 114 to ensure a better bond results when brazing is completed.

In one preferred bonding method, the temperature inside the furnace chamber 160, and preferably the temperature of the screen 34 inside the chamber 160, is initially raised to a temperature of at least 1650° F. (899° C.) to initiate melting of the brazing alloy. The temperature is then increased to a temperature above 1850° F. (1010° C.), preferably between 1850° F. and 1900° F. (1010° C. to 1038° C.), to cause the brazing alloy to fully melt and more uniformly or homogenously coat at least the faying surfaces 100, 102 and 106, 108 of each joint 112, 114. To ensure that brazing alloy adheres to the faying surfaces of each joint, the gap between the faying surfaces of each tongue and groove is no more than 0.008 inches. Such a tolerance helps ensure that the faying surfaces will be wetted by molten brazing alloy after the brazing alloy has reached a temperature at or above which it becomes a liquid or liquid-like.

The temperature is held between 1850° F. and 1900° F. (1010° C. to 1038° C.) for at least ten minutes. While at this temperature, annealing occurs relieving stresses in the screen sections 36 and the support rings 52, 54. More specifically, each screen section 36 is stress relieved which helps fix its round shape. This results in each screen section 36 being truer in round shape that will better retain a true roundness during its operating life.

During annealing, oxidation on the outer surfaces of the screen sections 36 and the support rings 52, 54 is also removed. Where the screen 34 is to be chromed, removal of oxidation by annealing creates a clean exterior screen surface for chroming. Annealing thus ensures that the entire exterior screen surface is uniformly deoxidized to ensure chrome will better and more uniformly adhere to the entire exterior surface area of the screen 34.

The temperature is then reduced somewhat to about 1800° F. (982° C.) for at least about one hour to diffuse out boron in the material of the screen sections 36 and support rings 52, 54. Boron diffusion increases the strength of the screen 34 by increasing ductility.

Where the screen sections 36 and support rings 52, 54 are made of an austenitic stainless steel, the screen 34 is then quenched down to a temperature of about 150° F. (66° C.) in less than about twenty minutes to minimize and preferably prevent carbide precipitation. Quenching preferably is done by quenching in an atmosphere of nitrogen gas.

Heating of the brazing alloy preferably is done in a vacuum inside the furnace chamber 160 of at least $4 \times 10^{-4}$ torr (0.00544 pascals) or better. The vacuum preferably is at least about $1 \times 10^{-4}$ torr (000136 pascals). During quenching, the pressure inside the chamber 160 preferably is raised to a pressure above ambient pressure.

In another preferred bonding method, brazing is performed in a vacuum at a temperature of at least 1675° F. (913° C.) to cause brazing to occur. Brazing preferably occurs by heating the screen to a temperature of 1750° F.±25° F. (between 941° C. and 968° C.) for at least about 15 minutes.

Annealing preferably occurs at temperature of at least about 1875° F. (1024° C.) and the temperature is raised at least to a temperature where annealing occurs. Preferably, the temperature is raised to a temperature of between 1900° F. and 1925° F. (1052° C. to 1052° C.) and held there for at least about 15 minutes.

The temperature is then reduced to a temperature below 1850° F. (1010° C.) that is preferably about 1700° F. (927° C.) for at least one hour to ensure boron diffusion occurs. The screen 34 being brazed preferably is held at this temperature between one and two hours in the vacuum.

Nitrogen quenching is done. Quenching is performed to quickly lower the temperature of the brazed screen 34 through the range of 1600° F. and 1200° F. (871° C. to 649° C.) to prevent carbide formation. Preferably, the temperature is reduced below 1700° F. (927° C.) and nitrogen quenching is performed to reduce the temperature down to about 150° F. (66° C.). Preferably, the temperature of the screen 34 is reduced to 150° F. (66° C.) within about twenty minutes.

When the brazed screen 34 is removed from the furnace 150, the exterior surface preferably is scale free and shiny. No post brazing treatment similar to post welding treatment is needed. More specifically, no buffing or grinding is needed after brazing. Additionally, unlike a welded screen, the inner diameter is uniform and there is no thermal distortion.

After the screen 34 has been removed from the furnace 150, the braze stop-off masking material is removed. In one preferred removal method, the brazed screen is sandblasted to deburr the slots 62. Sandblasting also advantageously removes the braze stop-off masking material. In another preferred method of removing the braze stop-off material, the brazed screen 34 can be dipped in acid, preferably nitric acid.

After sandblasting, the screen 34 preferably is electropolished to remove sharp points and corners. To electropolish the screen 34, the screen 34 is put in a vat of acid, preferably phosphoric acid, and an electrical current is passed through the screen 34.

If the screen 34 is to be chromed, a layer of chrome plating preferably is applied after electropolishing. Although the screen shown in FIG. 20 has a layer of chrome 162 applied only to a portion of the screen, the chrome plating operation preferably deposits a layer of chrome 162 on the entire outer surface (and inner surface) of the screen 34.

Figure 20A:
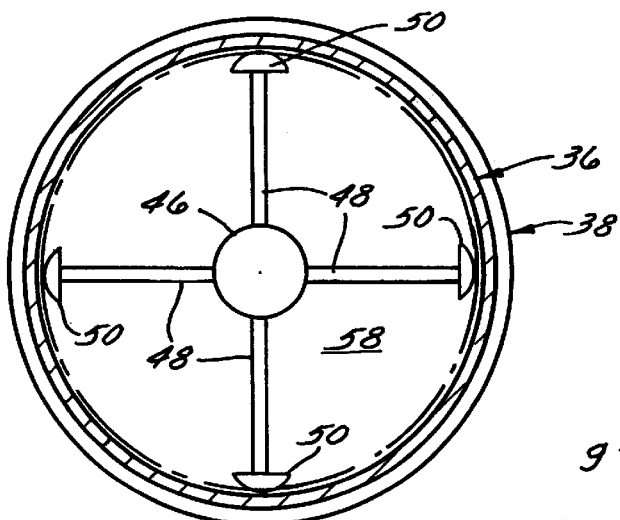
FIG. 20A is a transverse cross sectional view of an assembled and bonded screen basket disposed in a screening apparatus with a rotor and foil disposed in an interior chamber of the screen basket.
Figure 20B:
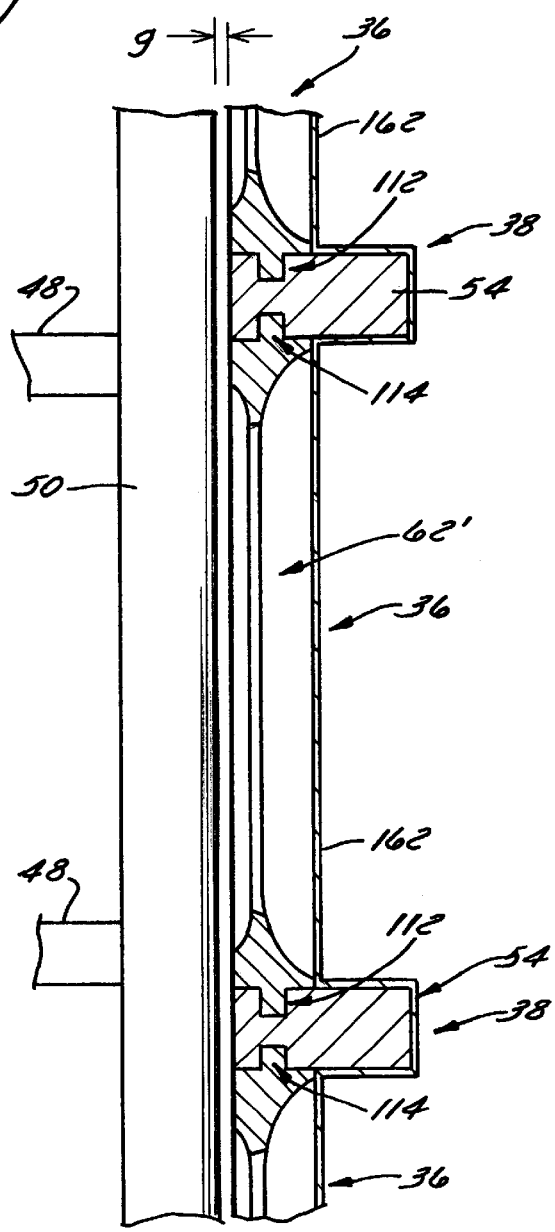
FIG. 20B is a fragmentary longitudinal cross sectional view of the assembled and bonded screen basket shown in FIG. 20A.

Referring to FIGS. 20A–20B, after assembly and brazing is finished, the screen 34 is assembled into a screening apparatus, such as the apparatus shown in FIG. 1. Where the apparatus is equipped with a rotor 46, the rotor 46 rotates, such as in the counterclockwise direction shown in FIG. 20A. As a result of the screen 34 being annealed and stress relieved during brazing, the screen 34 has truer roundness than welded screens. As a result, the gap, g, between the outer radial tip of the foil 50 and the inner radial surface 164 is more uniform the entire axial length of the screen 34 circumferentially along the entire inner periphery of the screen 34. Preferably, the outer radial edge of the foil 50 is substantially parallel to the inner radial surface 164 of the screen 34 about the entire inner screen periphery. Pulses thus produced by the rotor 46 during operation advantageously have a magnitude that is more uniform along the entire inner radial surface 164 of the screen 34. This makes the rotor 46 operate more effectively along the entire inner radial surface 164 of the screen 34, which decreases plugging of the screen 34 and increases the throughput and effectiveness of the screen 34.

FIG. 21 illustrates a prior art welded screen construction 166. The screen construction 166 shown includes a pair of spaced apart support rings 168, 170 that are both attached by upper and lower welds 172, 174 to a screen section having filter slots 176. The distance between the bottom surface of the upper ring 168 and the top surface of the lower ring 170 is a length, $L_1$. This distance, $L_1$, represents the maximum filtering length available between the rings.

Each weld 172, 174 (fillet weld) is at least ⅛ inch (12.7 mm) wide, which reduces the maximum filtering length available by at least about ¼ inch (6.4 mm). For screens having a diameter of at least two foot, each weld 172, 174 can be as much as ¼ inch (6.4 mm) in width or wider, which reduces the maximum filtering length available by at least about ½ inch (12.7 mm). As a result of being welded, the length, $L_2$, of each filter slot 176 is limited to less than the maximum filtering length, $L_1$, by at least ½ inch (12.7 mm), which significantly reduces the surface area that is slotted and effective for filtering. As a result, the length of each contour cut 178 is $L_3$, which is a length that is also at least ½ inch (12.7 mm) less than the length of $L_1$.

FIG. 22 illustrates a brazed screen construction 34 of the present invention. The distance between the bottom surface of the upper ring 38 and the top surface of the lower ring 38 is also $L_1$ (the same length as $L_1$ shown in FIG. 21). As a result of having no welds at the support rings 38, the length $L_4$, of slot 62, is at least 1/16 inch (1.6 mm) longer than the slot shown in FIG. 21. For a screen 34 having a diameter of at least two feet (0.61 m), the length $L_4$, of slot 62, is at least ⅛ inch (3.2 mm) longer than the slot shown in FIG. 21. Preferably, the slot is at least about ⅜ inch (9.5 mm) longer than the slot shown in FIG. 21. Thus, for a given length between support rings, the brazed screen construction permits the length, $L_4$, of each slot to be at least ⅛ inch (3.2 mm) longer that the slots of screens having a welded construction, such as the screen shown in FIG. 21. As is shown in FIG. 22, the back groove 68 and hence the slot 62 extends substantially the length, $L_1$, between adjacent support rings 38.

The weldless screen construction 34 shown in FIG. 22 enables slots 62 to be made at least 5% longer in length and have at least 5% greater open area for a given support ring spacing and screen diameter. As a result, the end of each back groove 68 of each slot 62 can extend to within 4 millimeters, and preferably within 3 millimeters, of the support ring 38 to which it is closest. Where the slot 62 is constructed like the slot 62 depicted in FIGS. 3–5, the inclusion of material relief 74 increases the length (at least the effective slot length) and open area by at least an additional 10%.

Figure 26:
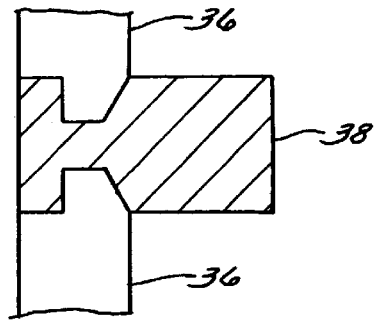
FIGS. 23–32 each depict a preferred embodiment of a joint configuration.
Figure 23:
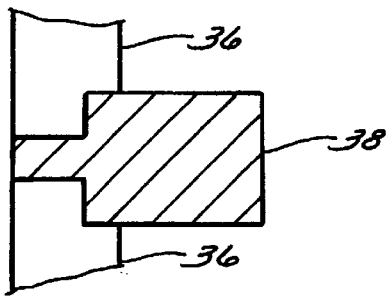
Figure 27:
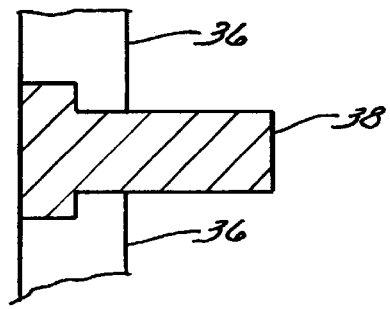
Figure 24:
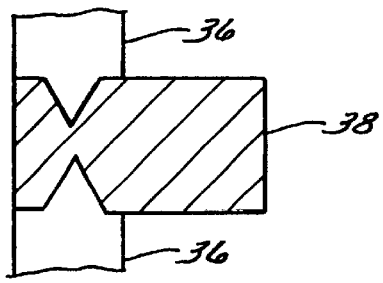
Figure 28:
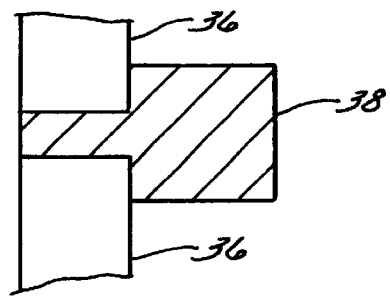
Figure 25:
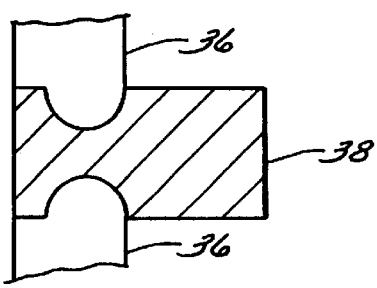
Figure 29:
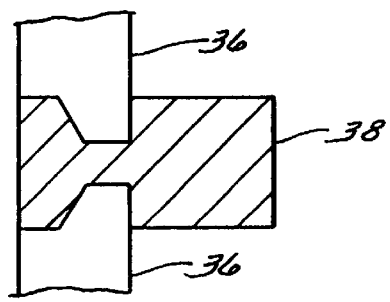
Figure 30:
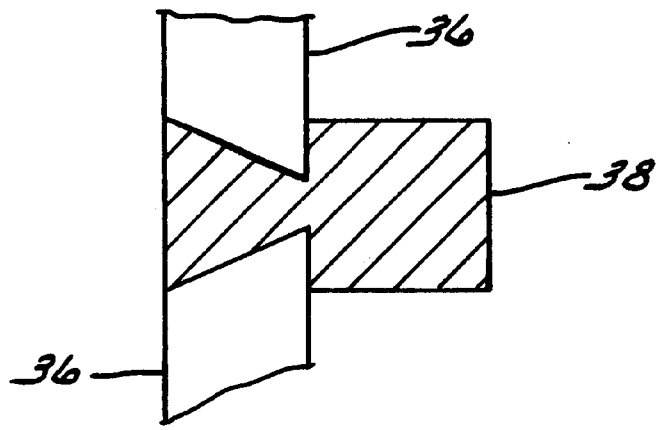
Figure 31:
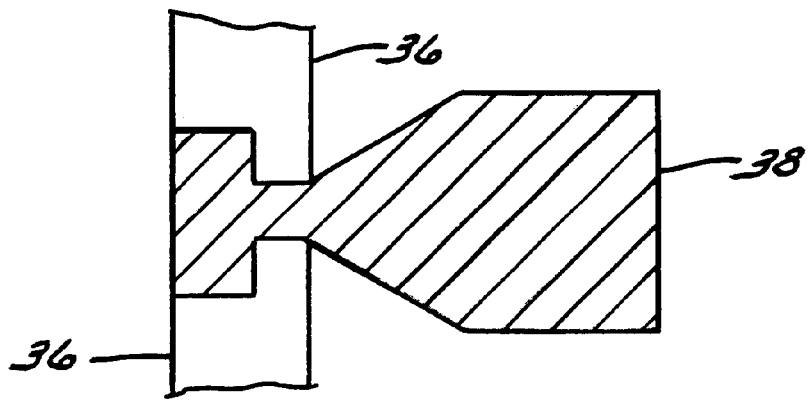
Figure 32:
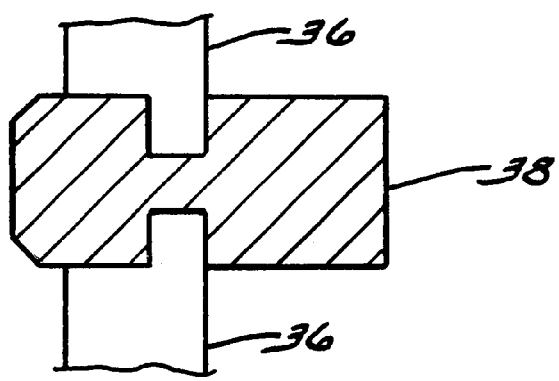

FIGS. 22–32 illustrate additional preferred brazed joint arrangements. FIGS. 22–27, 29, and 31–32 illustrate additional preferred tongue and groove joint assemblies. In FIG. 22, each tongue is disposed radially outwardly toward the flange of the support ring 38. In FIG. 24, each tongue has a generally vee-shaped cross sectional shape. In FIG. 25, each tongue has a rounded end. In FIGS. 26 and 29, at least one of the faying surfaces is beveled or inclined at an angle relative to the longitudinal central axis of the screen 34. In FIG. 31, each groove has a beveled surface that is not a faying surface. FIG. 28 simply depicts the square end of each screen section 36 received in a channel (or groove) in the ring 38. FIG. 30 simply depicts a beveled end of each screen section 36 received in a complementarily shaped groove in the ring 38.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A screen basket for a pulp screening apparatus comprising:
   a plurality of perforate cylindrical screen sections disposed along a common longitudinal axis, the plurality of screen sections each formed of a cylindrical plate having a pair of axial edges and a plurality of parallel screening slots formed therein;
   a pair of annular end support rings with (a) one of the end support rings engaging an axial edge of one of the plurality of screen sections forming a first tongue and groove joint therebetween that has a bonding material disposed therein that weldlessly bonds the one of the end support rings to the one of the plurality of screen sections, and (b) the other one of the end support rings engaging an axial edge of another one of the plurality of screen sections forming a second tongue and groove joint therebetween that has a bonding material disposed therein that weldlessly bonds the other one of the end support rings to another one of the plurality of screen sections;
   an annular intermediate support ring that is disposed between a plurality of the screen sections forming a third tongue and groove joint formed between the intermediate support ring and one of the screen sections that has a bonding material disposed therein that weldlessly bonds the intermediate support ring to the one of the screen sections and a fourth tongue and groove joint formed between the intermediate support ring and another one of the screen sections that has a bonding material disposed therein that weldlessly bonds the intermediate support ring to the another one of the screen sections;
   wherein a plurality of the screening slots each include a back groove that has each one of its ends disposed within four millimeters of a support ring.

2. The screening apparatus of claim 1 wherein each tongue and groove joint comprises a tongue having a pair of sidewalls and a groove having a pair of sidewalls that each abut one of the sidewalls of the tongue when the tongue is received in the groove and wherein there is a gap between each pair of abutting sidewalls that is no greater than 0.008 inches.

3. The screening apparatus of claim 2 wherein the tongue has a squared end and the groove has a complementary square cross section.

4. The screen basket of claim 1 wherein each one of the screen sections is comprised of an austenitic stainless steel, the weldless bond comprises brazing material that is heated when weldlessly bonding the screen sections to the intermediate support ring, and each screen section becomes annealed and stress relieved as a result of the heating.

5. The screening apparatus of claim 1 wherein each support ring is comprised of stainless steel.

6. The screening apparatus of claim 5 wherein the support ring and the screen sections are coated with chromium.

7. The screen basket of claim 1 wherein each one of the screen sections comprises an axially slotted metal plate and no tie rods connect the support rings disposed at each end of the screen basket.

8. The screen basket of claim 1 wherein each one of the screen sections is comprised of a metal plate with each one of the screening slots communicating with a slit and each one of the screen sections has a cross sectional thickness of no greater than nine millimeters and each slit has a length of at least two centimeters and a width of no more than one-half of a millimeter.

9. The screen basket of claim 1 wherein each one of the support rings is of endless and non-welded construction.

10. The screen basket of claim 9 wherein each one of the rings is centrifugally cast.

11. The screen basket of claim 1 wherein each one of the tongue and groove joints is comprised of two pairs of faying surfaces that are spaced apart by a gap of no greater than about four thousandths of an inch and wherein the bonding material comprises brazing material disposed in each gap that weldlessly bonds each pair of the faying surfaces.

12. A screen basket for a screening apparatus that screens fibrous matter in a liquid slurry comprising:

a plurality of perforate cylindrical screen sections each comprised of a metal plate having a pair of axial edges and a plurality of axially-extending and parallel screening slots disposed between the axial edges that each communicates with a back groove;

a pair of circular end support rings with one of the end support rings weldlessly attached to one of the plurality of screen sections at one end of the screen basket at a first brazed joint that is disposed between an axial edge of one of the screen sections and the one of the end support rings, and the other one of the end support rings weldlessly attached to another one of the screen sections at the other end of the screen basket at a second brazed joint that is disposed between an axial edge of the another one of the screen sections and the other one of the end support rings;

a circular intermediate support ring that is disposed between a plurality of the screen sections and that weldlessly attaches the plurality of screen sections at a third brazed joint between an axial edge of one of the plurality of screen sections and the intermediate support ring and at a fourth brazed joint between an axial edge of another one of the plurality of screen sections and the intermediate support ring;

a brazing material that is disposed in each brazed joint having a tolerance no greater than eight thousandths of an inch and that is heated to braze each brazed joint;

wherein no axially extending rod or axially extending brace interconnects the end support rings at a location radially spaced from the screen sections; and wherein each screen section comprises an annealed screen section due to brazing.

13. The screen basket of claim 12 wherein each one of the support rings is centrifugally cast or forged.

14. The screen basket of claim 12 wherein each one of the brazed joints is comprised of a pair of opposed faying surfaces that are spaced apart by a gap of no greater than about four thousandths of an inch and wherein the brazing material is disposed in the gap to weldlessly bond the faying surfaces.

15. The screen basket of claim 14 wherein each one of the brazed joints comprises a tongue and groove joint.

16. The screen basket of claim 12 wherein each one of the brazed joints is comprised of a plurality of pairs of spaced apart and opposed faying surfaces that have brazing material introduced therebetween by vacuum brazing with the brazing material weldlessly bonding one of the support rings to one of the screen sections.

17. A screen basket for a pulp screening apparatus that screens pulp in a stock slurry comprising:

a plurality of perforate metallic cylindrical screen sections each comprised of a plate having a pair of axial edges and a plurality of axially-extending screening slots disposed between the axial edges that each communicates with a back groove;

a pair of circular end support rings with one of the end support rings attached to one of the plurality of screen sections at one end of the screen basket at a first joint that is disposed between an axial edge of one of the screen sections and the one of the end support rings and that is comprised of a pair of faying surfaces having a tolerance therebetween of no greater than eight thousandths of an inch with one of the faying surfaces being disposed on the one of the end support rings and the other one of the faying surfaces disposed on the one of the screen sections, and the other one of the end support rings attached to another one of the screen sections at the other end of the screen basket at a second joint that is disposed between an axial edge of the another one of the screen sections and the other one of the end support rings and that is comprised of a pair of faying surfaces having a tolerance therebetween of no greater than eight thousandths of an inch with one of the faying surfaces being disposed on the one of the end support rings and the other one of the faying surfaces disposed on the another one of the screen sections;

a circular intermediate support ring that is disposed between a plurality of the screen sections and that attaches the plurality of screen sections at a third joint between an axial edge of one of the plurality of screen sections and the intermediate support ring and that is comprised of a pair of faying surfaces having a tolerance therebetween of no greater than eight thousandths of an inch with one of the faying surfaces being disposed on the intermediate support ring and the other one of the faying surfaces disposed on the one of the screen sections, and at a fourth joint between an axial edge of another one of the plurality of screen sections and the intermediate support ring and that is comprised of a pair of faying surfaces having a tolerance therebetween of no greater than eight thousandths of an inch with one of the faying surfaces being disposed on the intermediate support rings and the other one of the faying surfaces disposed on another one of the screen sections;

a brazing material disposed in each joint bonding each pair of the faying surfaces; and wherein no tie rod or connector extends from one of the end support rings to the other one of the support rings.

18. The screen basket of claim 17 wherein each one of the support rings is centrifugally cast or forged.

19. The screen basket of claim 17 wherein each one of the joints comprises a tongue and groove joint.

20. The screen basket of claim 17 wherein each back groove has a plurality of ends with each one of the ends extending to within four millimeters of one of the support rings.

21. A screen basket for a pulp screening apparatus that screens pulp in a stock slurry comprising:

a plurality of perforate cylindrical screen sections each having a plurality of axially-extending machined slots that each include a machined back groove;

a pair of centrifugally cast end support rings with one of the end support rings weldlessly attached to one of the plurality of screen sections at one end of the screen basket at a first brazed joint that is disposed between an axial edge of one of the screen sections and the one of the end support rings, and the other one of the end support rings weldlessly attached to another one of the screen sections at the other end of the screen basket at a second brazed joint that is disposed between an axial edge of the another one of the screen sections and the other one of the end support rings;

a centrifugally cast intermediate support ring that is disposed between a plurality of the screen sections and that weldlessly attaches the plurality of screen sections at a third brazed joint between an axial edge of one of the plurality of screen sections and the intermediate support ring and at a fourth brazed joint between an axial edge of another one of the plurality of screen sections and the intermediate support ring;

a brazing material disposed in each one of the brazed joints;

wherein each back groove has a pair of ends that are both located within four millimeters of an adjacent one of the support rings;

wherein each one of the brazed joints is comprised of a pair of opposed faying surfaces that are spaced apart by a gap of no greater than about eight thousandths of an inch;

whereing brazing material is disposed in each one of the gaps weldlessly bonding the faying surfaces; and wherein pulp flows from an inflow side of each one of the screen sections through a plurality of the slots to an outflow side.

22. The screen basket of claim 21 wherein each one of the brazed joints comprises a tongue and groove joint.

23. The screen basket of claim 21 wherein each pair of opposed faying surfaces are spaced apart by a gap of no greater tan about four thousandths of an inch and no axially extending tie rod interconnects the end support rings.

24. A screen basket for a pulp screening apparatus that has a rotor disposed in the screen basket and that screens pulp in a stock slurry comprising:

a plurality of perforate cylindrical screen sections each having a plurality of axially-extending machined slots that each include a machined back groove;

a pair of centrifugally cast end support rings with one of the end support rings weldlessly attached to one of the plurality of screen sections at one end of the screen basket at a first vacuum brazed joint that is disposed between an axial edge of one of the screen sections and the one of the end support rings, and the other one of the end support rings weldlessly attached to another one of the screen sections at the other end of the screen basket at a second vacuum brazed joint that is disposed between an axial edge of the another one of the screen sections and the other one of the end support rings;

a centrifugally cast intermediate support ring that is disposed between a plurality of the screen sections and that weldlessly attaches the plurality of screen sections at a third vacuum brazed joint between an axial edge of one of the plurality of screen sections and the intermediate support ring and at a fourth vacuum brazed joint between an axial edge of another one of the plurality of screen sections and the intermediate support ring;

wherein each back groove has a pair of ends that are both located within four millimeters of an adjacent one of the support rings;

wherein each vacuum brazed joint has a tolerance of no greater than four thousandths of an inch; and wherein pulp flows from an inflow side of each one of the screen sections through a plurality of the slots to an outflow side.

25. The screen basket of claim 24 wherein each one of the slots of each one of the screen sections communicates with a slit through which pulp being screened passes.

26. The screening apparatus of claim 25 the screen section has a cross sectional thickness of no greater than nine millimeters and the slit has a length of at least two centimeters and a width of no more than one-half a millimeter.

27. A screen basket for a pulp screening apparatus that screens pulp in a stock slurry comprising:

a plurality of perforate cylindrical screen sections each having a plurality of axially-extending machined slots that each include a machined back groove;

a pair of end support rings with one of the end support rings attached to one of the plurality of screen sections at one end of the screen basket at a first tongue and groove joint that is disposed between an axial edge of one of the screen sections and the one of the end support rings, and the other one of the end support rings attached to another one of the screen sections at the other end of the screen basket at a second tongue and groove joint that is disposed between an axial edge of the another one of the screen sections and the other one of the end support rings;

an intermediate support ring that is disposed between a plurality of the screen sections and that attaches the plurality of screen sections at a third tongue and groove joint between an axial edge of one of the plurality of screen sections and the intermediate support ring and at a fourth tongue and groove joint between an axial edge of another one of the plurality of screen sections and the intermediate support ring;

a brazing material disposed in each one of the tongue and groove joints;

wherein each tongue and groove joint has a tolerance of no greater than eight thousandths of an inch;

wherein each back groove has a pair of ends that are both located within four millimeters of an adjacent one of the support rings; and wherein pulp flows from an inflow side of each one of the screen sections through a plurality of the slots to an outflow side.

28. The screen basket of claim 27 wherein each one of the support rings comprises a centrifugally cast support ring.

29. A screen basket for a pulp screening apparatus that screens pulp in a stock slurry comprising:

a plurality of perforate cylindrical screen sections each having a plurality of axially-extending slots that each include a back groove;

a pair of end support rings with one of the end support rings attached to one of the plurality of screen sections at one end of the screen basket at a first tongue and groove joint that is disposed between an axial edge of one of the screen sections and the one of the end support rings, and the other one of the end support rings attached to another one of the screen sections at the other end of the screen basket at a second tongue and groove joint that is disposed between an axial edge of the another one of the screen sections and the other one of the end support rings;

an intermediate support ring that is disposed between a plurality of the screen sections and that attaches the plurality of screen sections at a third tongue and groove joint between an axial edge of one of the plurality of screen sections and the intermediate support ring and at a fourth tongue and groove joint between an axial edge of another one of the plurality of screen sections and the intermediate support ring;

a bonding material disposed in each one of the tongue and groove joints weldlessly bonding each one of the support rings to one of the screen sections;

wherein each tongue and groove joint has a tolerance of no greater than four thousandths of an inch;

wherein each back groove has a pair of ends that are both located within four millimeters of an adjacent one of the support rings;

wherein no tie rod or brace interconnects the end support rings; and wherein pulp flows from an inflow side of each one of the screen sections through a plurality of the slots to an outflow side.

* * * * *

UNITED STATES PATENT AND TRADEMARK OFFICE
CERTIFICATE OF CORRECTION

PATENT NO.     : 6,491,168 B1
DATED          : December 10, 2002
INVENTOR(S)    : Mark S. Lutz and Tim Cromell It is certified that error appears in the above-identified patent and that said Letters Patent is hereby corrected as shown below:

<u>Title page,</u>
Item [73], Assignee, please delete "J + L Fiber Services, Inc." and replace with
-- J & L Fiber Services, Inc. --.

Signed and Sealed this

Thirteenth Day of May, 2003

JAMES E. ROGAN
*Director of the United States Patent and Trademark Office*